US008856902B2

(12) United States Patent
Payne et al.

(10) Patent No.: US 8,856,902 B2

(45) Date of Patent: Oct. 7, 2014

(54) USER AUTHENTICATION VIA MOBILE COMMUNICATION DEVICE WITH IMAGING SYSTEM

(75) Inventors: Charles Andrew Payne, Los Angeles, CA (US); Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 299 days.

(21) Appl. No.: 12/969,303

(22) Filed: Dec. 15, 2010

(65) Prior Publication Data

US 2012/0159591 A1 Jun. 21, 2012

(51) Int. Cl.

| | |
|---|---|
| ***G06F 7/04*** | (2006.01) |
| ***H04L 29/06*** | (2006.01) |
| ***G09C 5/00*** | (2006.01) |
| ***G06F 21/36*** | (2013.01) |
| ***H04L 9/32*** | (2006.01) |
| ***G06F 21/35*** | (2013.01) |

(52) U.S. Cl.

CPC ................ *G06F 21/36* (2013.01); *H04L 63/08* (2013.01); *G09C 5/00* (2013.01); *H04L 2209/80* (2013.01); *H04L 9/3228* (2013.01); *G06F 2221/2153* (2013.01); *G06F 21/35* (2013.01)

USPC ........................................ 726/7; 726/3; 726/4

(58) Field of Classification Search

None

See application file for complete search history.

(56) References Cited

U.S. PATENT DOCUMENTS 8,177,125 B1 5/2012 Cooley et al.
8,181,234 B2 * 5/2012 Ishida ............................... 726/7
2006/0200854 A1 * 9/2006 Saito ................................ 726/2
2008/0319905 A1 12/2008 Carlson
2009/0228701 A1 * 9/2009 Lin ............................... 713/155
2010/0023412 A1 1/2010 Kitagawa et al.
2010/0274859 A1 10/2010 Bucuk
2010/0275010 A1 10/2010 Ghirardi
2010/0280957 A1 11/2010 Gullberg
2011/0047606 A1 * 2/2011 Blomquist et al. ................ 726/7
2011/0208659 A1 8/2011 Easterly et al.
2011/0219427 A1 * 9/2011 Hito et al. ......................... 726/3
2011/0307318 A1 12/2011 LaPorte et al.
2011/0313870 A1 12/2011 Eicher et al.
2012/0012649 A1 1/2012 Hsu
2012/0158581 A1 6/2012 Cooley et al.

OTHER PUBLICATIONS

Official Action received from USPTO dated May 24, 2012 for U.S. Appl. No. 12/969,471, filed Dec. 15, 2010.

(Continued)

*Primary Examiner* — Jeffrey Pwu
*Assistant Examiner* — Carlos Amorin
(74) *Attorney, Agent, or Firm* — Brill Law Office; Jeffrey Brill

(57) ABSTRACT

A graphical authentication identifier is used to facilitate automatic authentication of a user. A graphical identifier authentication system receives a request from an authenticating entity for a onetime use graphical authentication identifier. In response to the received request, a onetime use graphical authentication identifier to be displayed by the authenticating entity is generated. A request for user authentication information by the authenticating entity is encoded in the graphical authentication identifier, which is transmitted to the authenticating entity for display (e.g., on a login screen). The onetime use graphical authentication identifier being displayed by the authenticating entity is captured by a registered user operated computing device. In response, the requested user authentication information is transmitted to the authenticating entity, such that the user is automatically authenticated to the authenticating entity, without the user manually entering the requested user authentication information.

20 Claims, 5 Drawing Sheets

(56) References Cited

OTHER PUBLICATIONS

Notice of Allowance received from USPTO dated Mar. 28, 2012 for U.S. Appl. No. 12/969,510, filed Dec. 15, 2010.

Official Action received from USPTO dated Dec. 4, 2012 for U.S. Appl. No. 12/969,471, filed Dec. 15, 2010.

Official Action received from USPTO dated Mar. 12, 2013 for U.S. Appl. No. 12/969,471, filed Dec. 15, 2010.

PCT International Search Report and Written Opinion for Counterpart Application PCT/US11/65300 dated Apr. 5, 2013, 8 pages.

* cited by examiner

USER AUTHENTICATION VIA MOBILE COMMUNICATION DEVICE WITH IMAGING SYSTEM

TECHNICAL FIELD

This disclosure pertains generally to computer security, and more specifically to using graphical identifiers for automatic user authentication.

BACKGROUND

Computer users typically login to many different websites (banking sites, shopping sites, work related sites, social networking sites, etc.), each of which requires a username and password. This frequent password-based logging in is inconvenient for users and creates opportunities for malicious parties to steal passwords. Users have the choice between using a different password for every website they login to, or repeating passwords across multiple sites. Using a different password for each site results in a large number of passwords for the user to manage. In such situations, users tend to forget their passwords, and therefore can find themselves unable to login to desired sites. To address this problem, some users write down their passwords in accessible locations, but this creates a security risk. Another partial solution is the use of a password manager, but this only works on the computer on which the password manager is installed, or on a computer which is synchronized thereto. This leaves the user unable to login to websites from other computers, such as those in hotel business centers, internet cafes, libraries, etc.

On the other hand, using the same password across multiple sites is not good security practice. If the single password becomes compromised, all of the user's accounts become vulnerable. Some users repeat passwords only across types of sites (for example, one password for social networks and a different password for financial sites). Even then, many users have a hard time remembering their passwords. Additionally, using a limited number of different passwords still creates more security risk than using a unique password for each site.

Malicious parties are able to steal passwords through various methods such as phishing, key loggers, network traffic monitoring, malicious browser plugins, and the replay of passwords captured for other sites. Password managers prevent password theft by key loggers (and mitigate phishing to some extent) but still leave the user vulnerable to other types of password misappropriation.

It would be desirable to address these issues concerning password-based logins.

Two factor authentication is becoming increasingly prevalent as laws are passed that require financial institutions to implement additional security measures. Two factor authentication is authentication of a user that requires two separate means of proof of the user's identity. In one factor authentication, the user can verify his or her identity with a single factor such as (most commonly) a password as described above, or (alternatively) a rolling value generated by a physical token or a biometric indicator such as a finger print or retina scan. In two factor authentication, two such factors (e.g., password and rolling value) must be provided. The most common form of two factor authentication currently uses a static user entered password as the first factor, with the addition of a rolling value that is generated and displayed to the user by a hardware key fob (such as RSA SecurID) or a specialized mobile device (such as Verisign VIP).

These hardware devices continue to generate new rolling values that are unique to the individual devices. A rolling value is a dynamic value which is regenerated every so often (e.g., every 30 seconds) or in response to given events (e.g., whenever the user presses a given input mechanism). A hardware device of the type mentioned above keeps generating a new rolling value, typically per period of time. Such a rolling value can be used to authenticate a user, and can be thought of as a rolling password associated with the specific generating device. Such rolling values typically comprise pseudo-random numbers of a given number of digits (e.g., six), generated based on a seed value such as the current time or a chain of previous values. An authenticating device is able to generate the same current rolling value as a given generating device at any given time (i.e., the authenticating device also has the seed value or whatever key is used to generate the rolling value). Thus, the authenticating device can verify that a received rolling value was actually generated by a given device.

Rolling value generating hardware devices are undesirable to users because they comprise yet another device for the user to carry. Additionally, the user must type in the current rolling value as well as the static password, which is even more burdensome than typing in the password alone. These devices are also undesirable to administrators and IT professionals, because they are frequently lost, have limited battery life and must be replaced on a reoccurring basis. There is rolling value generating software (for example, Verisign VIP), but this still requires the user to manually enter the current rolling value, and also presents a practical limitation to the length of possible rolling values.

It would be desirable to address these issues concerning two factor authentication as well.

SUMMARY

A graphical identifier authentication system uses a graphical authentication identifier to facilitate the automatic authentication of a user. The graphical identifier authentication system receives a request from an authenticating entity for a onetime use graphical authentication identifier. In some embodiments, the request from the authenticating entity identifies the specific authenticating information being requested by the authenticating entity. In some embodiments, the authenticating entity is a website that requires the user to login or otherwise enter authenticating information. In response to the received request, a onetime use graphical authentication identifier to be displayed by the authenticating entity is generated. A request for user authentication information by the authenticating entity is encoded in the graphical authentication identifier. In some embodiments, this further comprises encoding an identification of the specific authenticating information being requested by the authenticating entity in the graphical authentication identifier. In any case, the generated graphical authentication identifier is transmitted to the authenticating entity for display (e.g., on a login screen).

The onetime use graphical authentication identifier being displayed by the authenticating entity is captured by a registered user operated computing device (e.g., a mobile communication device). In response, the requested user authentication information is transmitted to the authenticating entity, such that the user is automatically authenticated to the authenticating entity, without the user manually entering the requested user authentication information. More specifically, the graphical identifier authentication system receives a request from the user operated computing device to automatically complete authentication of the user to the authenticating entity, responsive to the user operated computing device having captured the onetime use graphical authentication identifier being displayed by the authenticating entity. In some embodiments, the request received from the user operated computing device includes the specific authentication information requested by the authenticating entity. In other embodiments, the request specifies what authentication information is being requested by the authenticating entity, without including the authentication information itself.

In some embodiments, the requested authentication information comprises at least a second factor authentication rolling value that is predictable by the authenticating entity. In these instances, such a second factor authentication rolling value is generated (e.g., by a mobile communication device), responsive to the user operated computing device capturing the onetime use graphical authentication identifier being displayed by the authenticating entity. The generated rolling value is then transmitted to the authenticating entity.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
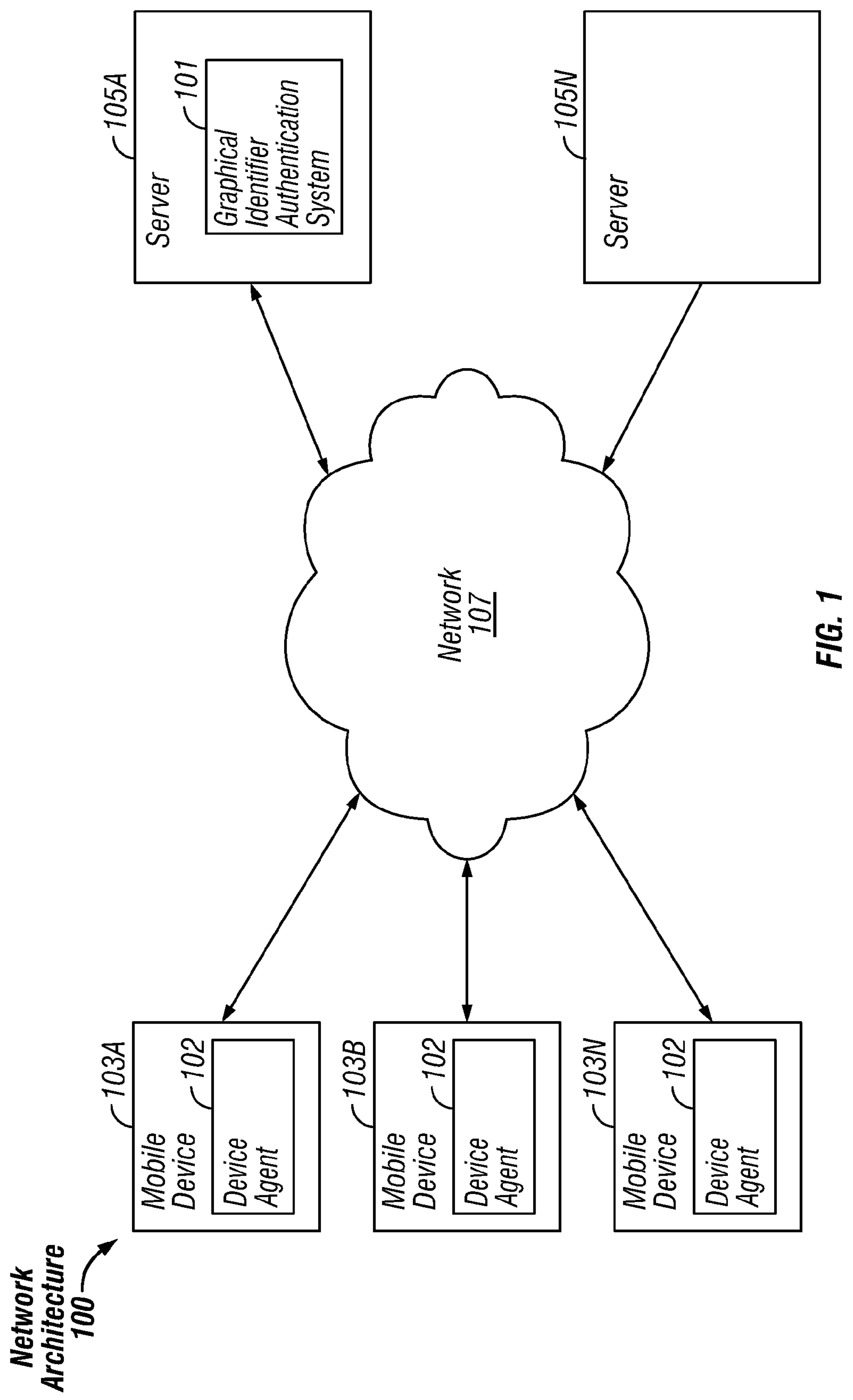
FIG. 1 is a block diagram of an exemplary network architecture in which a graphical identifier authentication system can be implemented, according to some embodiments.

FIG. 1 is a block diagram illustrating an exemplary network architecture 100 in which a graphical identifier authentication system 101 can be implemented. The illustrated network architecture 100 comprises multiple mobile communication devices 103A, 103B and 103N, as well as multiple servers 105A and 105N. In FIG. 1, the graphical identifier authentication system 101 is illustrated as residing on server 105A, with a device agent 102 thereof on each mobile communication device 103. It is to be understood that this is an example only, and in various embodiments various functionalities of this system 101 can be instantiated on a mobile communication device 103, a server 105 or can be distributed between multiple computing devices as desired.

It is to be understood that the mobile communication devices 103 described herein comprises portable computer systems 210 capable of connecting to a network 107 and running applications (such mobile communication devices 103 are sometimes referred to as smart-phones, but even many mobile phones not so designated have these capabilities). Mobile communication devices 103 and servers 105 can be implemented using computer systems 210 such as the one illustrated in FIG. 2 and described below. The mobile communication devices 103 and servers 105 are communicatively coupled to a network 107, for example via a network interface 248 as described below in conjunction with FIG. 2. Mobile communication devices 103 are able to access applicants and/or data on servers 105 using, for example, a web browser or other client software (not shown).

Although FIG. 1 illustrates three mobile communication devices 103 and two servers 105 as an example, in practice many more (or fewer) mobile communication devices 103 and/or servers 105 can be deployed. In one embodiment, the network 107 is in the form of the internet. Other networks 107 or network-based environments can be used in other embodiments.

Figure 2:
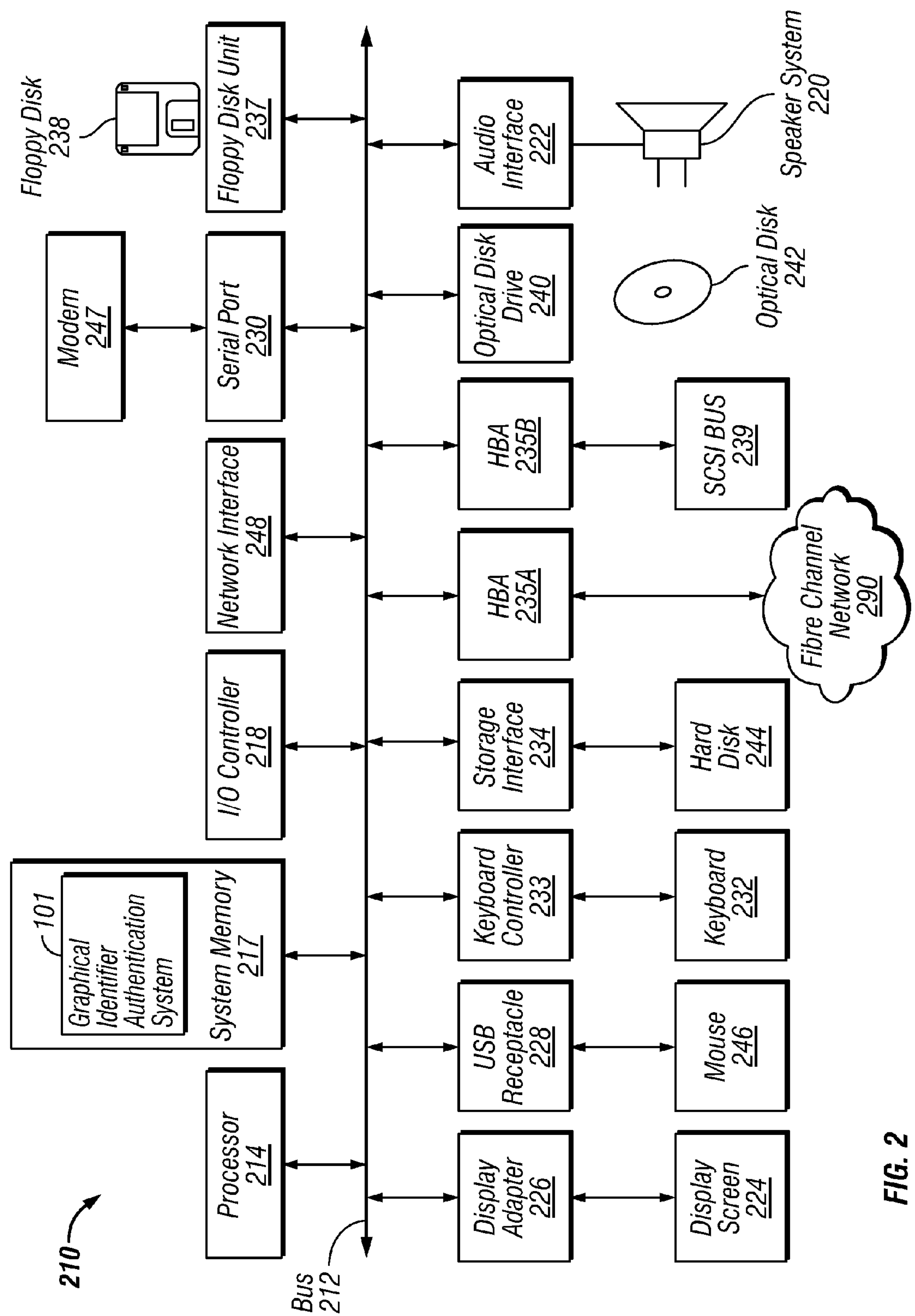
FIG. 2 is a block diagram of a computer system suitable for implementing a graphical identifier authentication system, according to some embodiments.

FIG. 2 is a block diagram of a computer system 210 suitable for implementing a graphical identifier authentication system 101. Both mobile communication devices 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the graphical identifier authentication system 101 is illustrated as residing in system memory 217. The workings of the graphical identifier authentication system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
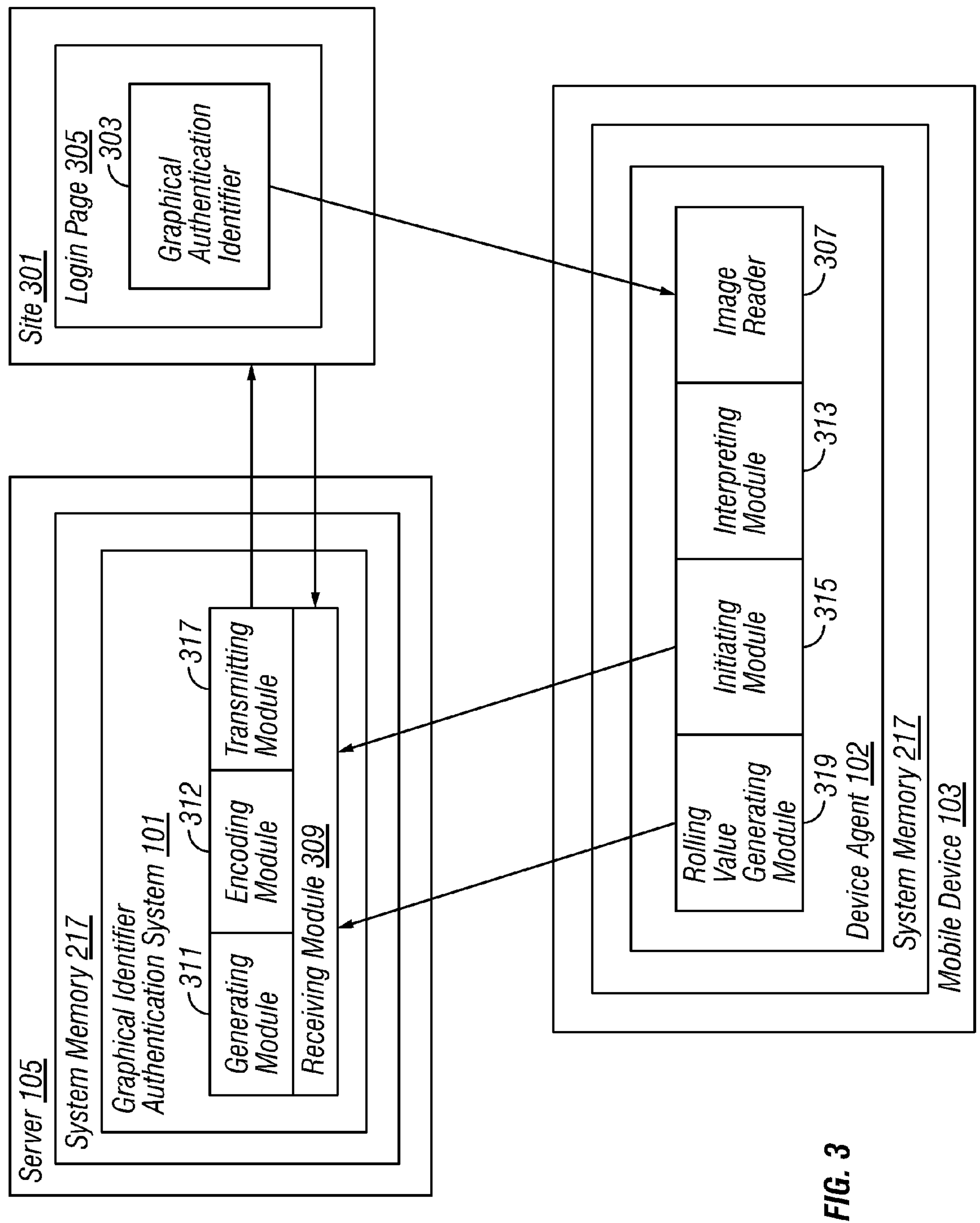
FIG. 3 is a block diagram of the operation of a graphical identifier authentication system, according to some embodiments.

FIG. 3 illustrates the operation of a device agent 102 residing in the system memory 217 of a mobile communication device 103 and a graphical identifier authentication system 101 residing in the system memory 217 of a server computer 105, according to some embodiments. As described above, the functionalities of the device agent 102 and the graphical identifier authentication system 101 can reside on a mobile communication device 103, a server 105, or be distributed between multiple computer systems 210, including within a cloud-based computing environment in which the functionality in question is provided as a service over a network 107. It is to be understood that although the device agent 102 and the graphical identifier authentication system 101 are illustrated in FIG. 3 as single entities, these components represent collections of functionalities, which can be instantiated as a single or multiple modules as desired (an instantiation of specific, multiple modules of the device agent 102 and the graphical identifier authentication system 101 are illustrated in FIG. 3). It is to be understood that the modules of the device agent 102 and of the graphical identifier authentication system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" "mobile communication device" and "computing device" mean one or more computers configured and/or programmed to execute the described functionality. Additionally, program code to implement the functionalities of the graphical identifier authentication system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, the graphical identifier authentication system 101 enables an authentication methodology that frees users from having to remember and manually enter a username and password for each site 301 they visit. Instead, a user is authenticated via the use of a special graphical authentication identifier 303 that is displayed on the target site's login screen 305. As explained in greater detail below, the graphical authentication identifier 303 is captured by an image reader 307 (e.g., digital camera, digital barcode reader, etc.) on a user's personal mobile communication device 103 (e.g., smart-phone, tablet computing device, etc.). Once the graphical authentication identifier 303 is captured, the device agent 102 running on the mobile communication device 103 interprets the graphical authentication identifier 303 as a request from the site 301 for the user to provide authentication credentials (e.g., username and password, rolling value, etc.). The device agent 102 on the mobile communication device 103 then directs the graphical identifier authentication system 101 to complete the authentication process for the user with the site 301 through back channels automatically, as described in more detail below.

In FIG. 3 the graphical identifier authentication system 101 is illustrated as residing on a server 105 which is separate from any site 301 to which a user is automatically authenticated via a graphical authentication identifier 303. In other embodiments, some or all of the functionality of the graphical identifier authentication system 101 can be provided directly by a computer 210 hosting an authenticating site 301. However, in embodiments in which the graphical identifier authentication system 101 runs on a separate server 105 as illustrated in FIG. 3, it can be used in conjunction with multiple authenticating sites 301. The graphical identifier authentication system 101 brokers trust between mobile communication devices 103 and sites 301 being accessed, in order to complete authentication of users by the sites 301 (including two factor authentication in some embodiments).

Each user that wishes to use the graphical authentication functionality obtains a mobile communication device 103 running a device agent 102. Such a user authenticates himself or herself to the graphical identifier authentication system 101, and registers his or her mobile communication device 103. The graphical identifier authentication system 101 can use any conventional authentication method to authenticate the user (username and password, identification check, bank transfer, credit card authentication, etc.). The graphical identifier authentication system 101 also identifies the specific mobile communication device 103 being operated by the authenticated user, for example by reading unique identifying information such as a serial number from the installed device agent 102 or the mobile communication device 103 itself. The graphical identifier authentication system 101 stores an association between that user and the specific mobile communication device 103, so that the graphical identifier authentication system 101 can later recognize the authorized user and registered mobile communication device 103.

A graphical authentication identifier generating module 311 of the graphical identifier authentication system 101 generates onetime use graphical authentication identifiers 303 for use by authenticating sites 301. A graphical authentication identifier comprises an indication of a request for authentication information from a specific site 301. A graphical authentication identifier 303 can be output as a visible image that can be captured and interpreted by a mobile communication device 103 running a device agent 102. In one embodiment, graphical authentication identifiers 303 comprise renderable QR Codes that can be embedded on web pages. In addition to QR Codes, simple barcodes, 2d barcodes (3-DI, ArrayTag, Aztec Code, Codablock, Code 1, Code 16K, Code 49, ColorCode, CP Code, DataGlyphs, Data Matrix, Datastrip, Dot Code A, HCCB (Microsoft Tag), hueCode, Intacta.Code, MaxiCode, MiniCode, PDF 417, Snowflake code, SuperCode, Ultracode) and/or other computer identifiable data encoding mechanisms can be used in other embodiments. The amount of information encoded in graphical authentication identifiers 303 can vary between sites 301 and embodiments. A graphical authentication identifier 303 can encode the identification of the site 301 to which it is issued, and an indication of what specific authenticating information the site is requesting. In other instances, a graphical authentication identifier 303 identifies the site 301, but the graphical identifier authentication system 101 and/or device agents 102 track what authentication information is requested by which site 301. In any case, a graphical authentication identifier encoding module 312 encodes information in a graphical authentication identifier 303 such that it can be interpreted by a device agent 102, as described below.

When a site 301 that supports graphical authentication identifiers 303 wishes to authenticate a user (for example, at load time of a page containing a login screen 305), the site 301 issues a request to the graphical identifier authentication system 101 for a graphical authentication identifier 303. A receiving module 307 of the graphical identifier authentication system 101 on the server receives the request. In response to the received request, the graphical authentication identifier generating module 311 generates a onetime use graphical authentication identifier 303 for the site 301. In some instances, the request identifies the specific requested authentication information to encode in the graphical authentication identifier 303. In other instances, the graphical identifier authentication system 101 stores this information per site 301, and encodes it in the generated graphical authentication identifier 303. In yet other instances, this information is not encoded in the graphical authentication identifier 303, as noted above. In any case, a transmitting module 317 of the graphical identifier authentication system 101 transmits the generated graphical authentication identifier 303 to the requesting site 301.

Figure 4:
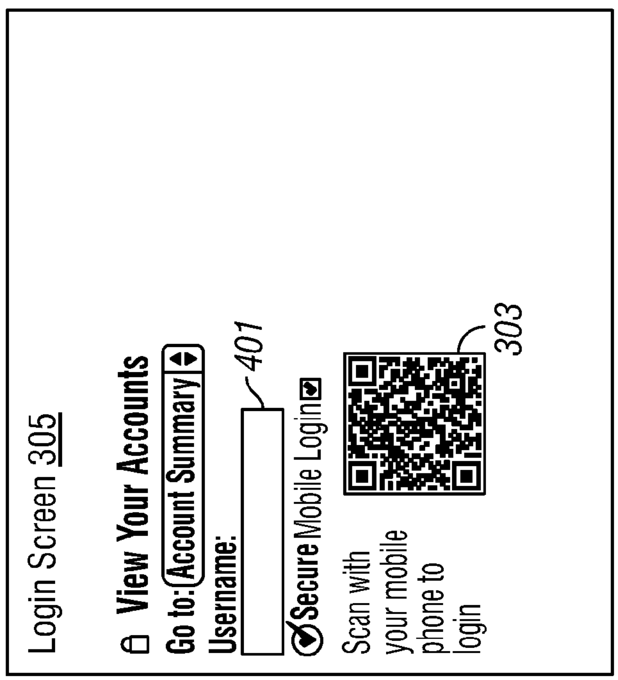
FIG. 4 is a mock screenshot of a website displaying a graphical authentication identifier, according to some embodiments.

The site 301 receives the graphical authentication identifier 303, and processes it so as to display the resulting image on its login screen 305. In some embodiments, the only request for authentication displayed by the site 301 is the graphical authentication identifier 303 itself. In other embodiments the graphical authentication identifier 303 is displayed in addition to a conventional prompt for at least some authentication information. For example, users can be given an option to login by manually entering information or by using the graphical authentication identifier 303. In some embodiments, some authentication information is entered conventionally (e.g., a first authentication factor) and some via the graphical authentication identifier 303 (e.g., a second authentication factor). FIG. 4 illustrates a login screen 305 of a website displaying a graphical authentication identifier 303, as well as a conventional prompt 401 for a username.

Figure 5:
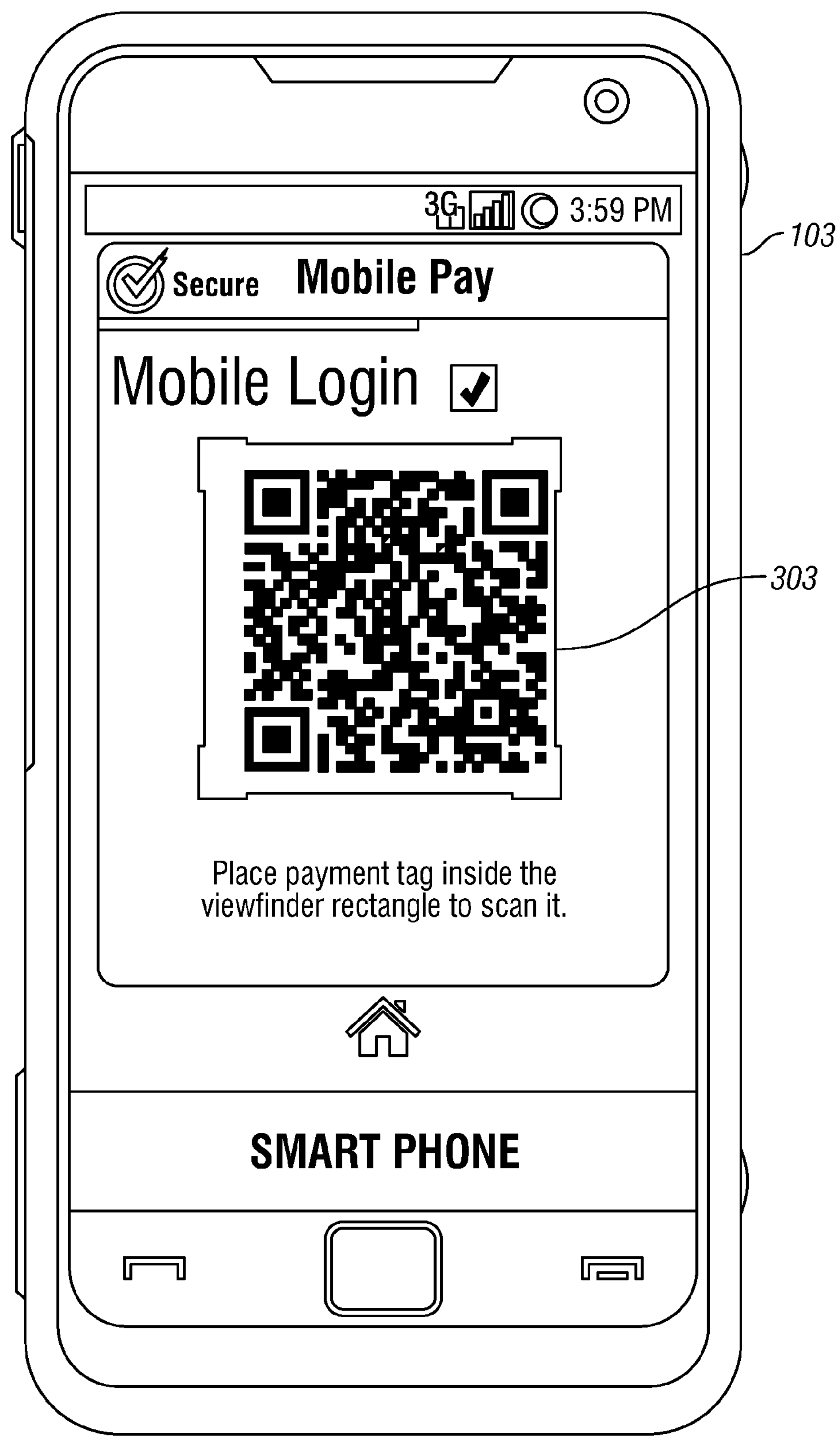
FIG. 5 is a diagram of a mobile communication device capturing a displayed graphical authentication identifier, according to some embodiments.

When a user views a site's login screen 305 containing a graphical authentication identifier 303, the user can login automatically by using a registered mobile communication device 103. In some embodiments, the device agent 102 prompts the user to identify himself, in order to prevent unauthorized parties from using stolen mobile devices 103. This user identification can comprise entry of a four digit personal identification number (pin), or another conventional authentication method such as a fingerprint scan, facial geometry recognition or other biometric authentication, depending on the capabilities of the mobile device 103. Once the user is identified at the mobile device level 103, the user points the image reader 307 of the mobile communication device 103 at the graphical authentication identifier 303 being displayed on the site's login screen 305, and activates the image reader 307 (e.g., takes a digital photograph of or scans the graphical authentication identifier 303). The image reader 307 captures the graphical authentication identifier 303, and a graphical identifier interpreting module 313 of the device agent interprets the information encoded therein as a request by the site 301 for authentication information. FIG. 5 shows a mobile communication device 103 capturing a graphical authentication identifier 303 according to some embodiments.

The graphical identifier interpreting module 313 interprets the information encoded in the graphical authentication identifier 303, which, as explained above, typically identifies the site 301 that is requesting authentication information and in some cases the specific authentication information being requested. In some embodiments the graphical identifier interpreting module 313 displays a confirmation to the user that it has successfully interpreted the graphical authentication identifier 303. In any case, an automatic authentication initiating module 315 of the device agent 102 initiates the automatic authentication of the user to the site 301, by communicating with the graphical identifier authentication system 101, requesting that the graphical identifier authentication system 101 automatically complete the authentication of the user.

The request from the mobile device 103 to automatically complete the authentication of the user is received by the receiving module 309 of the graphical identifier authentication system 101 on the server 105. In order to automatically complete the authentication of the user to the site 301, the transmitting module 317 of the graphical identifier authentication system 101 on the server 105 transmits the requested authentication information to the site 301, responsive to the mobile device 103 associated with the user capturing the graphical authentication identifier 303. In some cases, the automatic authentication initiating module 315 of the device agent 102 provides the requested authentication information to the graphical identifier authentication system 101 on the server 105. In some of these embodiments, the identification of what authentication information the site 301 is requesting is encoded in the graphical authentication identifier 303 which, as described above, is interpreted at a mobile device 103 level. In other such embodiments, the mobile device 103 tracks which site 301 requests what authentication information. In other embodiments, the graphical identifier authentication system 101 on the server 105 stores authentication information for registered users, and need not receive the requested information from the mobile device, but instead only the request to complete the authentication. In any case, the transmitting module 317 automatically completes the authentication, by transmitting the requested authentication information to the site 301. This authentication information can be transmitted to the site 301 proactively in responsive to the mobile device 103 having captured the graphical authentication identifier 303, or in response to a specific request from the site 301 itself. Once the site 301 has received the authentication information, the site 301 uses the authentication information to authenticate the user. Note that by using a graphical authentication identifier 303, the user is spared from having to manually enter the authentication information.

In some embodiments, the authentication in question is one factor authentication, in which case the transmitting module 317 typically transmits authentication information such as a username and password (or other single authentication factor) to the site 301. In other embodiments, the authentication is two factor, in which case the transmitting module 317 can instead or in addition provide the appropriate current rolling value to the site 301, thereby freeing the user from having to manually enter rolling values. This also allows for longer rolling values than conventional two factor authentication, because the rolling values do no need to be typed.

More specifically, in embodiments that support two factor authentication, a rolling value generating module 319 of the device agent 102 has the capability of securely generating rolling values that are predictable by supported authenticating sites 301 (that is, a supported authenticating site 301 has a corresponding seed needed to generate matching rolling values). In such embodiments, when a current rolling value is part or all of the requested authentication information, the rolling value generating module 319 generates a current rolling value which is transmitted to the graphical identifier authentication system 101 for use in the automatic authentication process.

It is to be understood that although the capturing of the graphical authentication identifier 303 and the initiating of the automatic authentication process is described above as being performed by the mobile device 103, in some embodiments the user can be interacting with the authenticating site 301 from a computer system 210 other than the mobile device 103. For example, the user could be browsing the internet on a desktop computer 210 (not illustrated), and reach a website requiring login that supports graphical authentication identifier 303 based authentication. The user could then use a registered mobile device 103 to capture the graphical authentication identifier 303 being displayed on the website's login screen 305, and the process described above would automatically log the user operating the desktop computer 210 into the website. In some embodiments, some or all of the functionality described as being performed by the mobile device 102 can be performed by a registered non-mobile computer 210. In some embodiments, the user interacts with the authenticating site 301 from the mobile device 103 after authentication.

Note that in some embodiments, the sites 301 referenced herein are websites that require the user to login. However, in other embodiments the functionality described herein can be used to authenticate a user to any electronic entity that requires the user to enter authentication information, and that graphically prompts the user to do so. For example, software applications or hardware devices that present users with login screens 305 and require authentication information from users could display a graphical authentication identifier 303 on their login screens 305 and the above-described functionality could be used to authenticate users.

The communication between the mobile device 103 and the graphical identifier authentication system 101 on the server 105, as well as between the graphical identifier authentication system 101 on the server 105 and the various authenticating sites 301 is typically encrypted for security. Additionally, because each graphical authentication identifier 303 is only usable one time, the communication cannot be successfully replayed. The communication between a mobile device 103 and the graphical identifier authentication system 101 on the server 105 can be conducted via SMS or other messaging services in instances where the mobile device 103 does not currently have access to the internet.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for using a graphical authentication identifier to automatically authenticate a user, the method comprising the steps of:

registering a user operated computing device associated with a user with an authenticating entity for user authentication, using a unique device identifier;

generating a onetime use graphical authentication identifier to be displayed by the authenticating entity for a first site of a plurality of sites, by at least one computer;

encoding a request for a first user authentication information that is specific to the first site by the authenticating entity in the onetime use graphical authentication identifier, by the at least one computer, wherein the first user authentication information requested by the first site differs from a second user authentication information requested by a second site of the plurality of sites; and responsive to the registered user operated computing device associated with the user capturing the onetime use graphical authentication identifier being displayed by the authenticating entity, receiving a transmission of requested user authentication information to the authenticating entity, by the at least one computer, such that the user associated with the registered user operated computing device is automatically authenticated to the authenticating entity, without the user manually entering the requested user authentication information.

2. The method of claim 1 further comprising:

receiving a request for a graphical authentication identifier from the authenticating entity, by the at least one computer; and transmitting the generated graphical authentication identifier to the authenticating entity, by the at least one computer.

3. The method of claim 1 wherein encoding the request for user authentication information in the onetime use graphical authentication identifier further comprises:

encoding an identification of specific authenticating information being requested by the authenticating entity, by the at least one computer.

4. The method of claim 3 wherein:

the received request for the graphical authentication identifier further identifies the specific authenticating information being requested by the authenticating entity.

5. The method of claim 1 further comprising:

receiving, by the at least one computer from the user operated computing device, a request to automatically complete authentication of the user to the authenticating entity, responsive to the user operated computing device having captured the onetime use graphical authentication identifier being displayed by the authenticating entity.

6. The method of claim 5 wherein:

the request received by the at least one computer from the user operated computing device further comprises the authentication information requested by the authenticating entity.

7. The method of claim 5 wherein:

the request received by the at least one computer from the user operated computing device further identifies what specific authentication information is being requested by the authenticating entity.

8. The method of claim 1 wherein:

the requested authentication information comprises at least a second factor authentication rolling value that is predictable by the authenticating entity, the method further comprising:

responsive to the user operated computing device capturing the onetime use graphical authentication identifier being displayed by the authenticating entity, generating a second factor authentication rolling value that is predictable by the authenticating entity.

9. The method of claim 1 wherein:

the authenticating entity further comprises a website.

10. The method of claim 1 wherein:

the user operated computing device further comprises a mobile communication device.

11. At least one computer readable storage medium, being non-transitory and storing program code for using a graphical authentication identifier to automatically authenticate a user, the computer readable storage medium-comprising:

program code for registering a user operated computing device associated with a user with an authenticating entity for user authentication, using a unique device identifier;

program code for generating a onetime use graphical authentication identifier to be displayed by the authenticating entity for a first site of a plurality of sites;

program code for encoding a request for a first user authentication information that is specific to the first site by the authenticating entity in the onetime use graphical authentication identifier, wherein the first user authentication information requested by the first site differs from a second user authentication information requested by a second site of the plurality of sites; and program code for, responsive to the registered user operated computing device associated with the user capturing the onetime use graphical authentication identifier being displayed by the authenticating entity, receiving a transmission of requested user authentication information to the authenticating entity, by the at least one computer, such that the user associated with the registered user operated computing device is automatically authenticated to the authenticating entity, without the user manually entering the requested user authentication information.

12. The computer readable storage medium of claim 11 further comprising:

program code for receiving a request for a graphical authentication identifier from the authenticating entity; and program code for transmitting the generated graphical authentication identifier to the authenticating entity.

13. The computer readable storage medium of claim 11 wherein the program code for encoding the request for user authentication information in the onetime use graphical authentication identifier further comprises:

program code for encoding an identification of specific authenticating information being requested by the authenticating entity.

14. The computer readable storage medium of claim 13 wherein:

the received request for the graphical authentication identifier further identifies the specific authenticating information being requested by the authenticating entity.

15. The computer readable storage medium of claim 11 further comprising:

program code for receiving, from the user operated computing device, a request to automatically complete authentication of the user to the authenticating entity, responsive to the user operated computing device having captured the onetime use graphical authentication identifier being displayed by the authenticating entity.

16. The computer readable storage medium of claim 15 wherein:

the request received from the user operated computing device further comprises the authentication information requested by the authenticating entity.

17. The computer readable storage medium of claim 15 wherein:

the request received from the user operated computing device further identifies what specific authentication information is being requested by the authenticating entity.

18. The computer readable storage medium of claim 11 wherein:

the requested authentication information comprises at least a second factor authentication rolling value that is predictable by the authenticating entity, the computer program product further comprising:

program code for, responsive to the user operated computing device capturing the onetime use graphical authentication identifier being displayed by the authenticating entity, generating a second factor authentication rolling value that is predictable by the authenticating entity.

19. A computer implemented method for using a graphical authentication identifier to automatically authenticate a user, the method comprising the steps of:

registering, by a user operated computing device, with an authentication entity for authentication of an associated user, using a unique device identifier;

capturing, by the registered user operated computing device, a onetime use graphical authentication identifier being displayed by the authenticating entity for a first site of a plurality of sites;

interpreting, by the registered user operated computing device, the graphical authentication identifier as a request by the authenticating entity for a first authentication information that is specific to the first site, wherein the first authentication information requested by the first site differs from a second authentication information requested by a second site of the plurality of sites; and initiating, by the registered user operated computing device, completion of automatic authentication of the associated user to the authenticating entity, without the associated user manually entering the requested user authentication information.

20. The method of 19 further comprising:

interpreting, by the registered user operated computing device, the graphical authentication identifier as a request by the authenticating entity for authentication information comprising at least a second factor authentication rolling value that is predictable by the authenticating entity;

generating, by the registered user operated computing device, a second factor authentication rolling value that is predictable by the authenticating entity; and transmitting the generated second factor authentication rolling value to at least one remote computer as part of the initiating of the completion of the automatic authentication of the associated user to the authenticating entity.

* * * * *